No. 753,235. PATENTED MAR. 1, 1904.
J. McG. CARSON.
CASH REGISTERING AND CHECKING APPARATUS.
APPLICATION FILED JAN. 21, 1901.
NO MODEL. 8 SHEETS—SHEET 1.

WITNESSES. INVENTOR.
Joseph Bates. Jas. McG. Carson
C. W. Alexander. by D. O'Brien O'Brien
  atty No. 753,235. PATENTED MAR. 1, 1904.
J. McG. CARSON.
CASH REGISTERING AND CHECKING APPARATUS.
APPLICATION FILED JAN. 21, 1901.
NO MODEL. 8 SHEETS—SHEET 2.

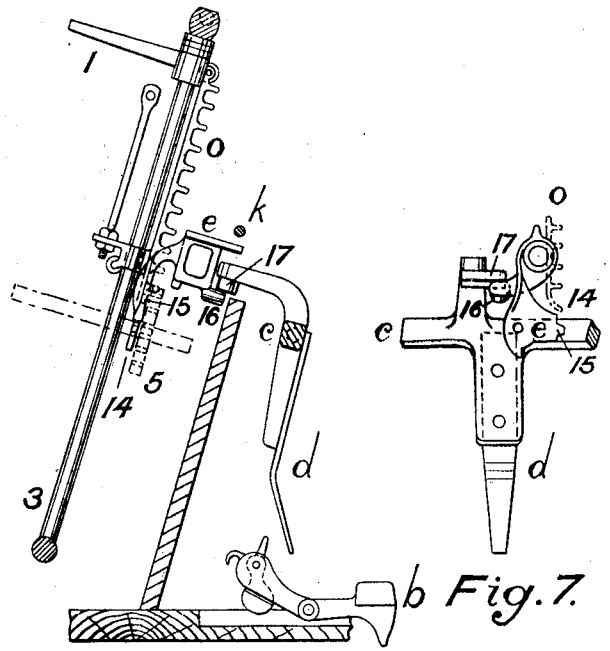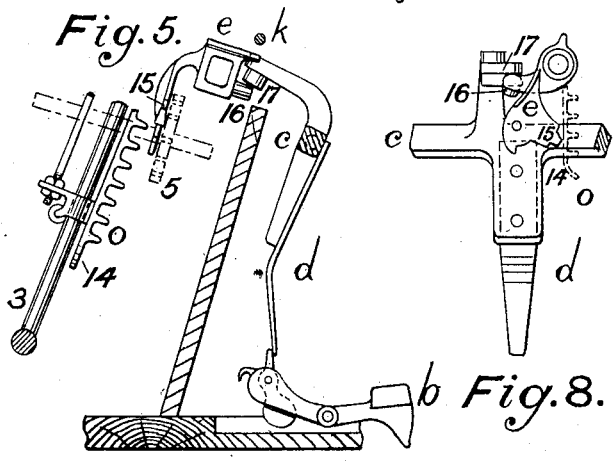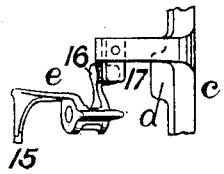

No. 753,235. PATENTED MAR. 1, 1904.
J. McG. CARSON.
CASH REGISTERING AND CHECKING APPARATUS.
APPLICATION FILED JAN. 21, 1901.
NO MODEL. 8 SHEETS—SHEET 5.
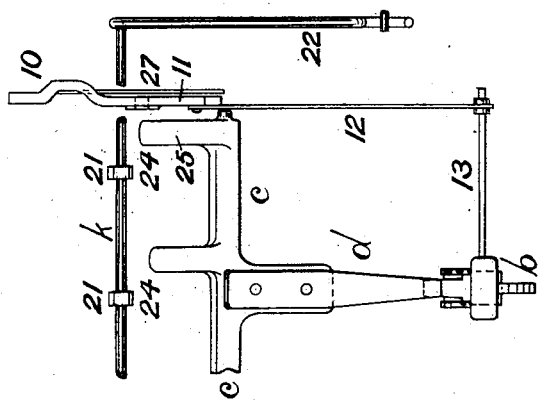
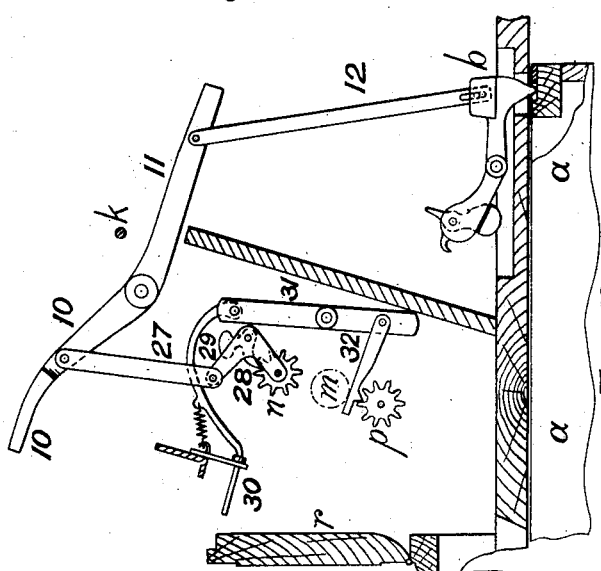
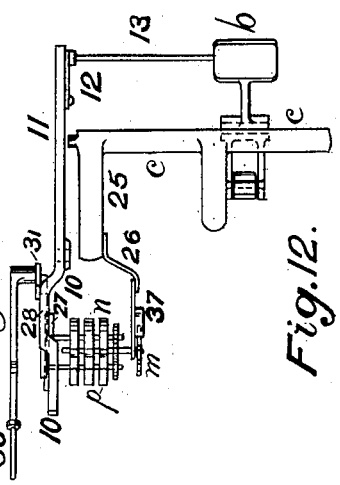
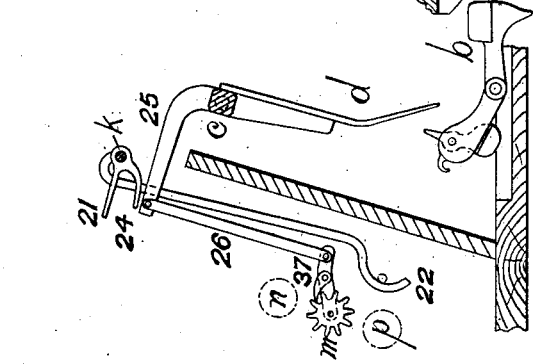
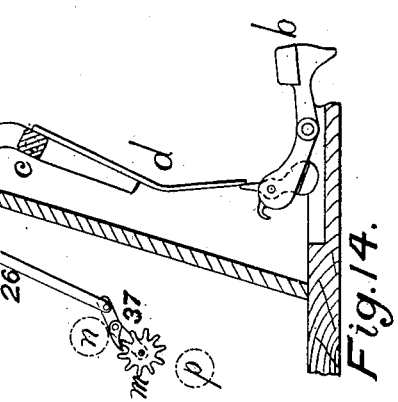
WITNESSES.
Joseph Bates.
C. W. Alexander.
INVENTOR.
Jas McG Carson
by J. Owden O'Brien
atty.

No. 753,235. PATENTED MAR. 1, 1904.
J. McG. CARSON.
CASH REGISTERING AND CHECKING APPARATUS.
APPLICATION FILED JAN. 21, 1901.
NO MODEL. 8 SHEETS—SHEET 6.

WITNESSES.
Joseph Bates.
C. W. Alexander.

INVENTOR.
Jas. McG Carson
by J. Owen O'Brien
atty.

No. 753,235. PATENTED MAR. 1, 1904.
J. McG. CARSON.
CASH REGISTERING AND CHECKING APPARATUS.
APPLICATION FILED JAN. 21, 1901.
NO MODEL. 8 SHEETS—SHEET 7.

WITNESSES. INVENTOR

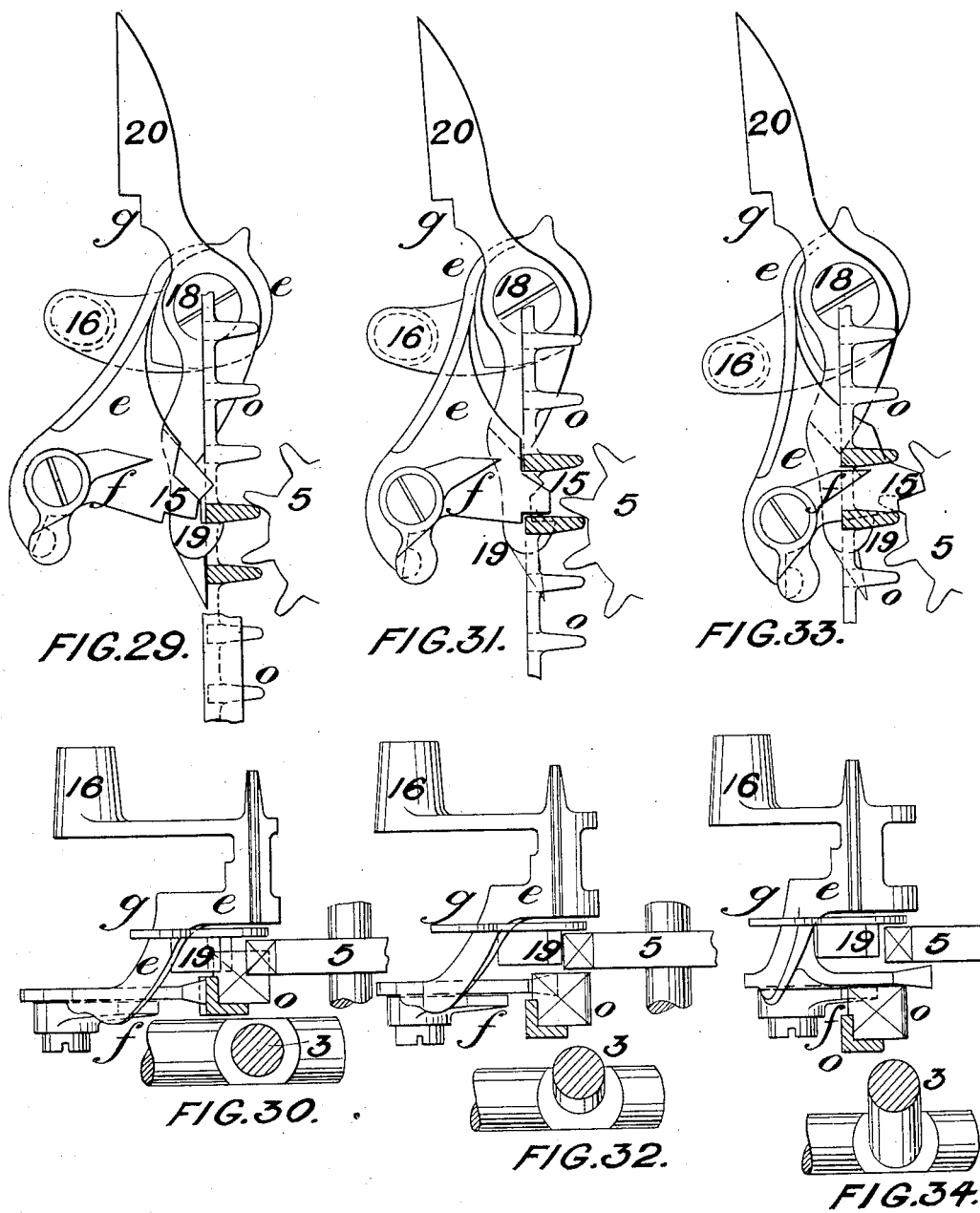

No. 753,235.

Patented March 1, 1904.

UNITED STATES PATENT OFFICE.

JAMES McGUFFOG CARSON, OF MANCHESTER, ENGLAND.

CASH REGISTERING AND CHECKING APPARATUS.

SPECIFICATION forming part of Letters Patent No. 753,235, dated March 1, 1904.

Application filed January 21, 1901. Serial No. 44,200. (No model.)

*To all whom it may concern:*

Be it known that I, JAMES McGUFFOG CARSON, a subject of the Queen of Great Britain, and a resident of Manchester, in the county of Lancaster, England, have invented certain new and useful Improvements in Cash Registering and Checking Apparatus, of which the following is a specification.

This invention relates to improvements in cash registering and checking apparatus in which racks carrying pointers or indicators are used to actuate the mechanism for counting and displaying the amounts. It will be fully described with reference to the accompanying drawings.

Figure 1:
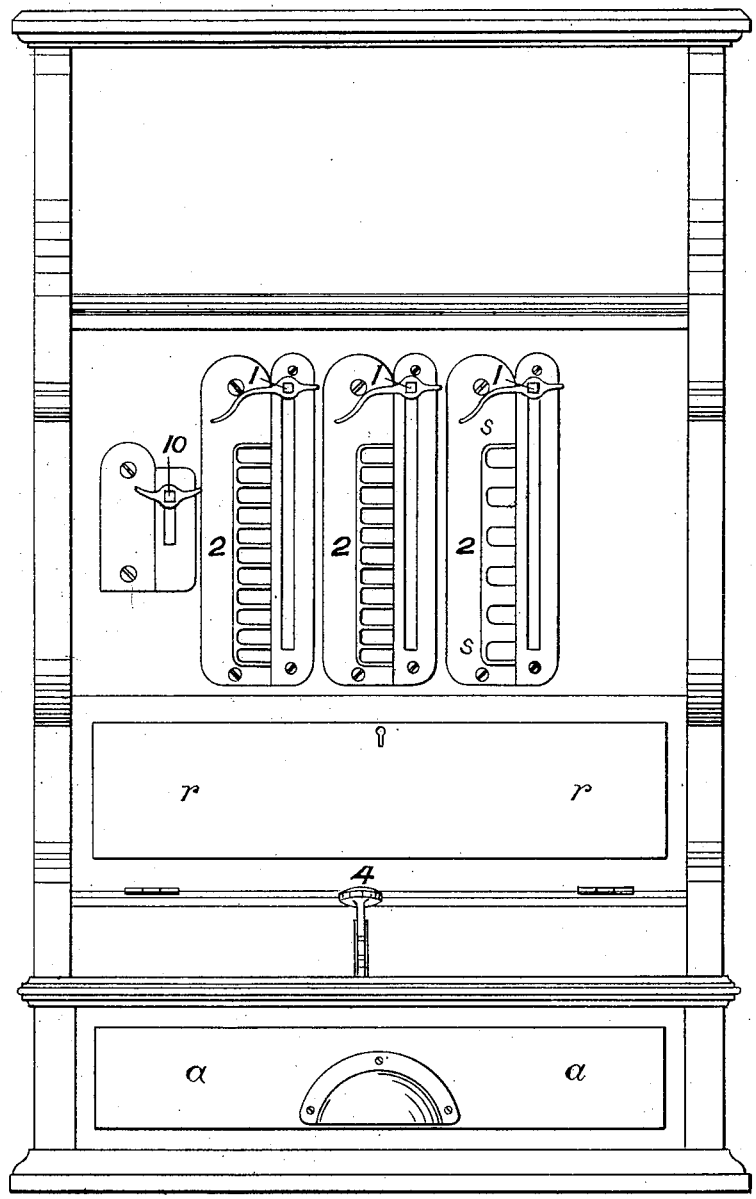
Figures 2, 4:
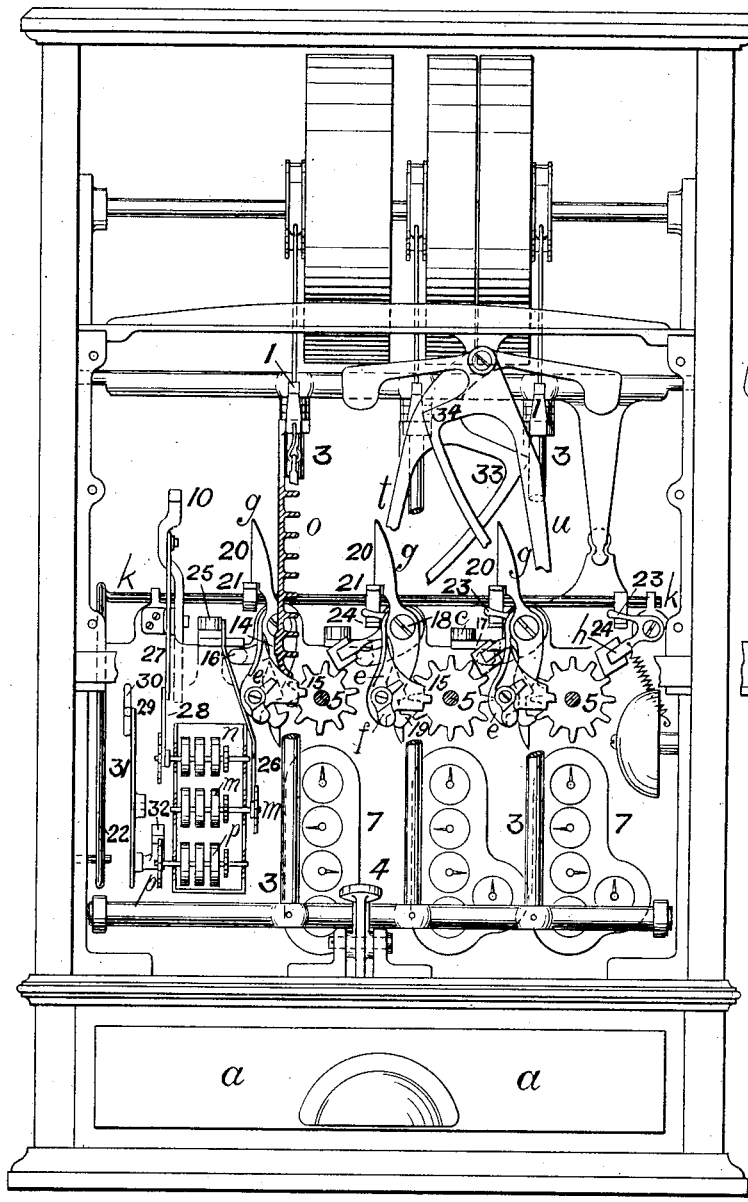
Figure 3:
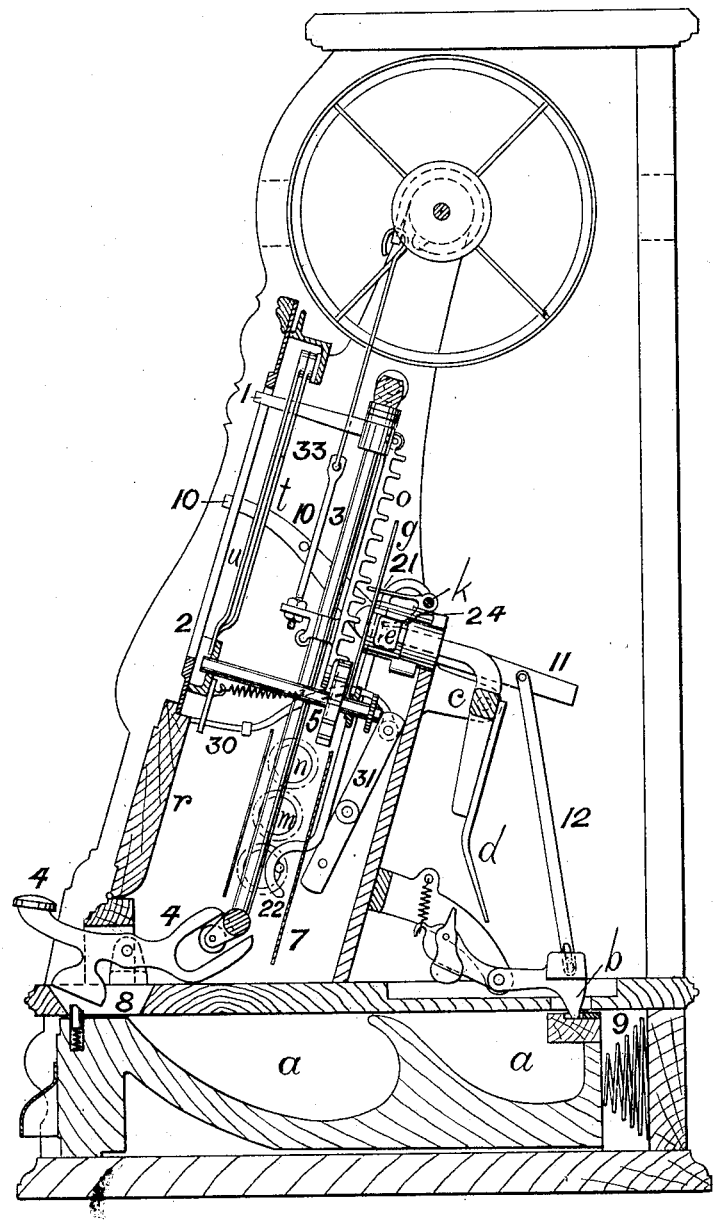
Figure 15:
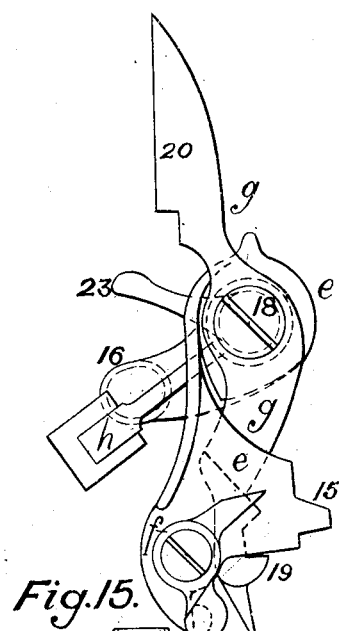
Figure 16:
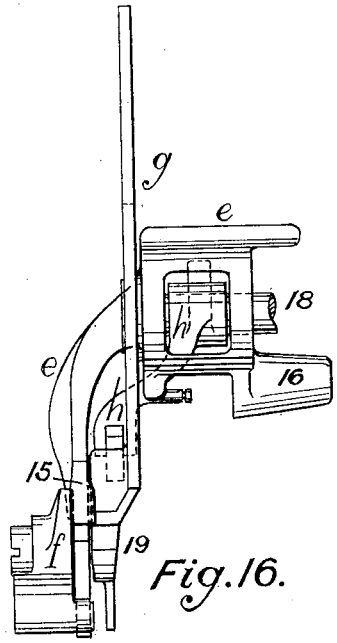
Figure 17:
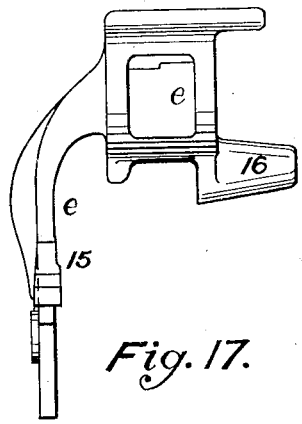
Figure 18:
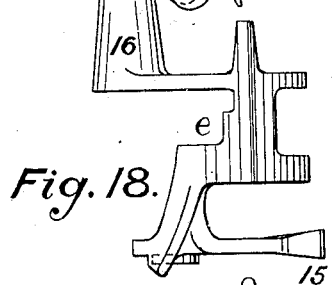
Figure 24:
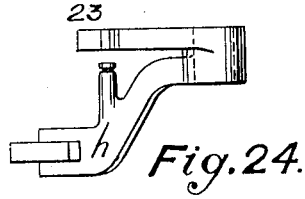
Figures 19, 20:
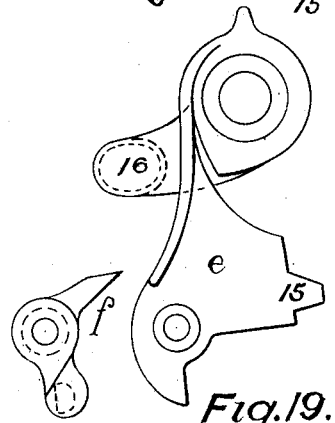
Figures 21, 22:
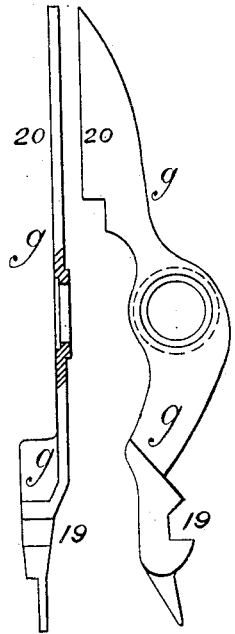
Figure 23:
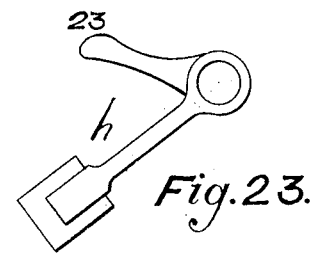
Figure 25:
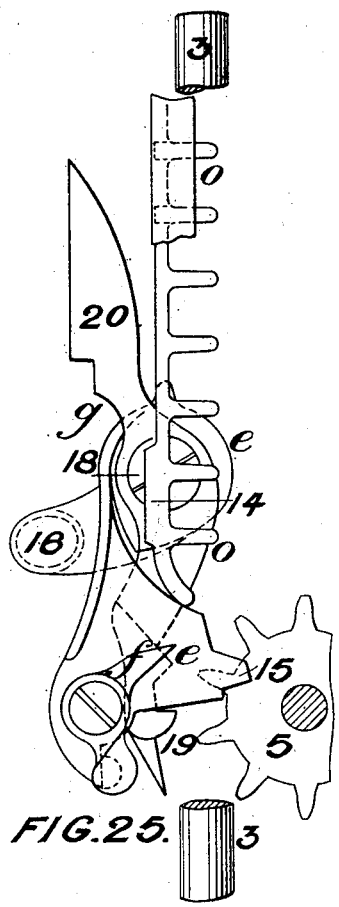
Figure 27:
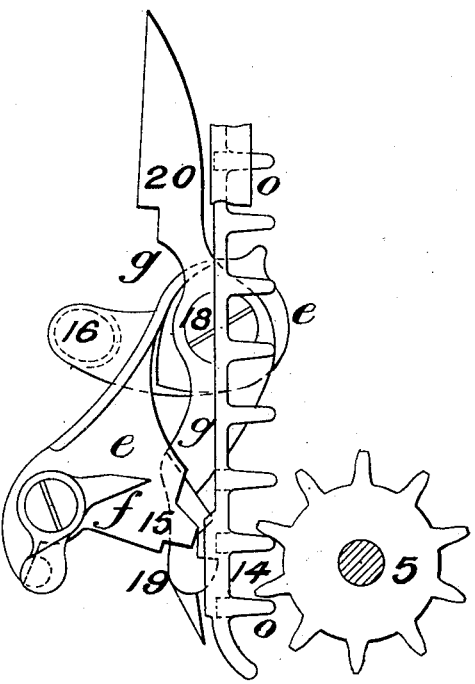
Figure 26:
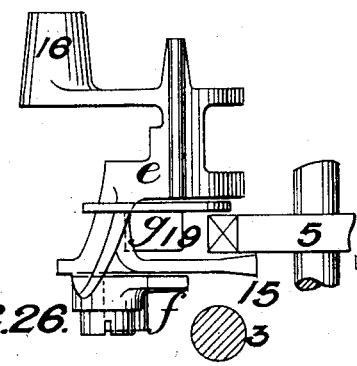
Figure 28:
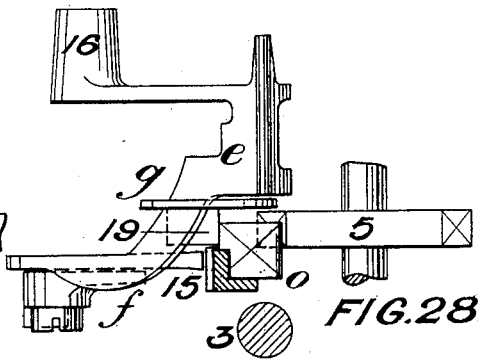

Figure 1 is a front elevation showing the outside casing; Fig. 2, front elevation with the front casing removed, showing the counting and indicating mechanism; Fig. 3, side elevation, partly in section, with end of casing removed; Fig. 4, front elevation of detail of mechanism for controlling the registering-fingers; Fig. 5, side elevation, partly in section, of detail of mechanism for releasing the drawer, showing the relative positions of the rack $o$, the rocking bar $c$, and the latch $b$ when the money-drawer is locked; Fig. 6, side elevation of parts shown in Fig. 5, showing their relative positions when the money-drawer is released; Fig. 7, back elevation of rocking bar $c$ and rack $o$ in same position as in Fig. 5; Fig. 8, back elevation of rocking bar $c$ and rack $o$ in same position as in Fig. 6; Fig. 9, plan of part of rocking bar $c$ and lifter $e$; Fig. 10, side elevation of pointer 10 and lever 11 for raising the latch $b$ and counting mechanism $n$ and $p$; Fig. 11, back elevation of Fig. 10; Fig. 12, plan of Fig. 10; Fig. 13, side elevation, partly in section, showing counting mechanism $m$ connected with the rocking bar $c$; Fig. 14, side elevation of same in position to release the money-drawer; Fig. 15, enlarged detailed front elevation of mechanism which engages or is actuated by the rack $o$; Fig. 16, side elevation of same; Fig. 17, side elevation of lever $e$ detached; Fig. 18, plan of lever $e$ detached; Fig. 19, front elevation of lever $e$ detached; Fig. 20, front elevation of catch or tumbler $f$ detached; Fig. 21, front elevation of lever $g$ detached; Fig. 22, side elevation of lever $g$ detached; Fig. 23, front elevation of lever $h$ detached; Fig. 24, plan of lever $h$ detached. Figs. 25 to 34 show side elevations and plans, the rack $o$, the lever $e$, tumbler-catch $f$, the lever $g$, and the tooth 19 thereon in their successive relative positions during the operation of the machine. Fig. 25 shows the position of the several parts when the machine is inoperative before the rack $o$ has been moved downward; Fig. 26, plan of Fig. 25. Fig. 27 shows the rack $o$ during its downward motion, with the tooth 19 resting against the teeth of the rack $o$, but prevented entering between them by the movement of the rack; Fig. 28, plan of Fig. 27. Fig. 29 shows rack $o$ brought to a standstill and the tooth 19 of the lever $g$ engaging with a tooth of rack to prevent further downward movement thereof; Fig. 30, plan of Fig. 29. Fig. 31 shows position of rack $o$ when partially drawn forward clear of the teeth of wheel 5, disengaging the tooth 19 on the lever $g$ and permitting the tooth 15 on lever $e$ to engage the teeth of the rack; Fig. 32, plan of Fig. 31. Fig. 33 shows position of rack when fully drawn forward to return to zero with the tumbler $f$ engaging the teeth to prevent a downward movement of the rack; Fig. 34, plan of Fig. 33.

The sliding racks $o$ are provided with the operating-pointers 1, which slide over the notched indicating-plates 2. They are pivoted to a rack-frame 3, below which is placed the rack-releasing apparatus 4 and the rack-actuated wheel 5, by which the counting and registering mechanism 7 is moved at each transaction.

The money-drawer $a$ is secured in front by a latch 8, which is released when the racks $o$ and pointers 1 are returned to their normal positions (out of gear with the registering mechanism) by the rack-releasing lever 4, which must be depressed after each transaction in order to draw the rack-frame 3 forward and withdraw the racks from the wheels 5 to permit of the upward movement of the racks to the normal position.

The pressing down of the releasing-lever 4 depresses the latch or bolt 8, allowing the drawer $a$ to be moved forward by the spring 9 behind it.

At the back of the drawer $a$ a second lock $b$ is placed, which retains the drawer closed until one of the racks $o$ has been drawn down to indicate the amount to be recorded. The downward movement of the rack $o$ causes the simultaneous movement of the lock $b$ and releases the drawer, which is then pushed forward by the spring 9.

The latch $b$ is shown in the position to lock or retain the drawer closed in Figs. 3 and 5 and also in Figs. 10 to 13 and in its raised position in Figs. 6 and 14. The latch $b$ is pivoted and is operated by a pivoted bar or rocking lever $c$, placed behind the racks $o$ and rocked or oscillated by the downward movement of either one of the racks. The rocking lever $c$ is provided with a depending arm $d$, which when moved inward passes over a small tumbler on the free end of the latch-lever $b$ and depresses it, raising the lever and releasing the drawer.

A separate pointer 10 without a rack is provided for operating the latch-lever $b$ when it is desired to open the money-drawer $a$ without registering any transaction. The pointer 10 has fitted to it a lever 11, extending behind, to which a link 12 is attached, the lower end of the link engaging a rod 13, extending from the latch $b$. When the pointer 10 is pulled down, the link 12 is raised and the link raises the latch $b$, releasing the drawer $a$.

Behind each rack $o$ is placed a small pivoted lever $e$, (shown separately in detail, Figs. 17, 18, and 19,) which is moved to one side by the rack $o$ as it descends. On the side of the rack is formed a projection or cam 14, which engages the projecting point 15 on the lower end of the lever $e$. Behind the lever $e$ is a projecting piece 16, on which rests an arm 17 of the rocking lever $c$. This is raised by the action of the rack $o$ upon the lever $e$ and the rocking lever $c$ thereby operated to raise the latch $b$ and release or open the money-drawer $a$.

The catch or tumbler $f$, (see Fig. 20,) pivoted to the lever $e$ falls between the teeth of the rack $o$ and prevents further downward movement of the rack after the rack-frame 3 has been drawn forward to release the rack $o$ from the wheel 5 to prevent a second manipulation of the rack before it has returned to zero and while not in gear with the registering mechanism.

On the same pivot 18 as the lever $e$ is pivoted a second lever $g$, (see Figs. 15, 21, and 22,) which hangs by the side of the rack $o$. This lever $g$ is constructed with a tooth 19 at its lower end, which is pushed back by the rack as it is drawn downward and enters between or engages with the teeth of the rack as soon as the downward movement of the rack ceases and it is brought to rest (see Figs. 29 and 30) to prevent a second movement of the rack after a transaction has been registered and before it has been returned to zero.

The upper end 20 of the lever $g$ engages with a movable stop-pin 21, attached to an oscillating or rocking bar $k$. The rocking bar $k$ and stop-pin 21 can be moved at will by a handle or lever 22, placed at one side of the machine. When the stop-pin 21 is raised against the face of the part 20 of the lever $g$, the tooth 19 at the lower end is held out of engagement with the rack, and when the stop-pin 21 is brought below the part 20 of the lever $g$, as shown in Fig. 2, the tooth 19 at the other end is free to fall forward and engage the rack to stop its movement. By means of the rocking bar $k$ and pin 21 the stop mechanism can be placed into or out of operation as required by the operator, so that the apparatus may be worked either with or without the lever $g$ and tooth 19, as may be required.

The lever $h$ (see Figs. 15, 23, and 24) is also pivoted upon the pivot 18 and engages the teeth of the rack-wheel 5, acting as a pawl to prevent any backward movement of the rack-wheel 5 and rack $o$. It is provided with a second arm 23, with which engages a second pin 24 on the rocking bar $k$. By rocking or turning the bar $k$ a sufficient distance by the handle or lever 22 the pin 24 lifts the lever $h$ out of contact with the wheel 5 to permit of a backward movement of the wheel.

The rocking bar $c$ is connected at one end by an arm 25 and link 26 (see Figs. 12, 13, and 14) with a register $m$, independent of the money-registers, to register the number of money transactions or sales which take place. The rocking of the bar $c$ raises the link 26 and pawl 37, thereby rotating the counter-wheel $m$ one unit.

To the change key or pointer 10, by which the money-drawer $a$ is opened without operating the racks or money-registers there is also attached a separate register $n$, by which the number of times the money-drawer is so opened is registered. A link 27 is connected to the lever 10 and to the register-wheel $n$ by a bell-crank 28, carrying a pawl 29, (see Figs. 10 and 12,) by which the register-wheel $n$ is moved one unit each time the pointer and key 10 is operated.

Another register, $p$, is added to register the number of times the front lid or plate $r$ is opened. This lid or plate $r$ provides access to the interior mechanism and money-registers of the apparatus. A projecting finger or rod 30 (see Figs. 10 and 12) is pivoted to one end of a lever 31, which at its other end carries a pawl 32, engaging with the register-wheel $p$. The projecting finger or rod 30 is pushed in by the plate or lid $r$ each time it is closed, and the register-wheel $p$ is thereby moved forward one unit.

Instead of an indicating-plate marked with only one-half of the money denomination—such as half-penny, half-cent, half-dollar, half-franc—it will be found more convenient to apply a money-indicating plate *s* marked "1½," "2½," "3½" and other amounts, so that such purchases including a half can be registered by one key instead of two. In order to prevent the key or pointer 1 being moved at the same time as that denoting the whole denomination—such as pence, cents, dollars, francs—which might cause a display of "11½" when only a single "1" and "1½" had been registered, two pivoted depending levers *t* and *u* (see Fig. 4) are placed one beneath each of the pointers or keys 1. The lever *t* is provided with a shoulder 33 and the lever *u* with a shoulder 34, which when the lever is pushed aside by one pointer or key comes into the path of the adjacent pointer or key and prevents it being moved. Thus if the key or pointer to the left be first moved the lever *t* is moved to one side until the shoulder 33 comes beneath and prevents the movement of the adjacent pointer, and vice versa.

What I claim as my invention, and desire to protect by Letters Patent, is—

1. In a cash registering and checking apparatus the combination with the actuating-racks *o*, pointers 1, swinging rack-frame 3, and cash-drawer *a*, of the latch *b* to retain the drawer closed until the rack *o* is operated, the rocking lever *c* operated by the rack and the arm *d* by which the latch *b* is raised substantially as described.

2. In a cash registering and checking apparatus the combination with the actuating-racks *o*, pointers 1, swinging rack-frame 3 and cash-drawer *a* of the pivoted latch *b* pivoted above the back of the cash-drawer, the rocking lever *c*, and depending arm *d*, the lever *e* pivoted between the rack and the rocking lever and provided with a projection 15 at one end with which the rack engages and a projection 16 at the other end which rocks the lever *c* substantially as described.

3. In a cash registering and checking apparatus the combination with the actuating-racks *o*, pointers 1, swinging rack-frame 3 and cash-drawer *a*, of the latch *b* pivoted above the back of the cash-drawer *a*, to retain the drawer closed until the rack *o* is operated the rocking lever *c* operated by the rack, the arm to raise the latch, the change-pointer 10, the projecting arm 11, the connecting-link 12, and the rod 13 attached to the latch *b* by which it is raised to release the drawer substantially as described.

4. In a cash registering and checking apparatus the combination with the actuating-racks *o*, pointers 1, swinging rack-frame 3, and cash-drawer *a*, of the latch *b* pivoted above the rack of the cash-drawer *a* to retain the drawer closed until the rack *o* has operated the rocking lever *c* operated by the rack, the arm to raise the latch, the pivoted lever *g* provided with a tooth 19 to engage the rack and prevent a second movement of the rack.

5. In a cash registering and checking apparatus the combination with the actuating-racks *o*, pointers 1, swinging rack-frame 3, and cash-drawer *a*, of the latch *b*, the pivoted lever *g* provided with a tooth 19 to engage the rack to prevent a second movement thereof, and a stop-pin 21, and rocking bar *k*, to lift the lever *g* out of operation substantially as described.

6. In a cash registering and checking apparatus the combination with the actuating-racks *o*, pointers 1, swinging rack-frame 3, and cash-drawer *a*, and rocking lever *c*, of the catch *b* releasing-finger *d* connecting-link 26, pawl 37, and counting mechanism *m* to register the number of transactions substantially as described.

7. In a cash registering and checking apparatus the combination with the actuating-racks *o*, pointers 1, swinging rack-frame 3 and cash-drawer *a* and the change-pointer 10 of the rocking lever *c*, retaining-catch *b*, releasing-finger *d*, connecting-link 27, lever 28 and pawl 29 and counting mechanism *n* to register the number of operations, substantially as described.

8. In a cash registering and checking apparatus the combination with the actuating-racks *o*, pointers 1, swinging rack-frame 3, and cash-drawer *a*, and lid *r* of the rocking lever *c*, retaining-catch *b*, releasing-finger *d*, rod 30, lever 31, pawl 32 and counting mechanism *p* to register the number of times the lid *r* has been opened, substantially as described.

9. In a cash registering and checking apparatus the combination with the actuating-racks *o*, pointers 1, swinging rack-frame 3 and cash-drawer *a*, of the rocking lever *c*, retaining-catch *b*, releasing-finger *d*, lever *t* provided with a shoulder 33 and the lever *u* provided with a lever 34 substantially as described.

In witness whereof I have hereunto signed my name in the presence of two subscribing witnesses.

JAMES McGUFFOG CARSON.

Witnesses:
J. OWDEN O'BRIEN,
B. TATHAM WOODHEAD.